United States Patent [19]
Adams et al.

[11] Patent Number: 5,671,217
[45] Date of Patent: Sep. 23, 1997

[54] SCALABLE COMMUNICATIONS NETWORK EMPLOYING SHARED LOGICAL NODES

[75] Inventors: Michael B. Adams, Castle Rock; Louis D. Williamson, Denver, both of Colo.

[73] Assignee: Time Warner Entertainment Co. L.P., Stamford, Conn.

[21] Appl. No.: 572,142

[22] Filed: Dec. 14, 1995

[51] Int. Cl.$^6$ .................................................. H04J 1/16
[52] U.S. Cl. ........................... 370/233; 370/486; 455/3.1
[58] Field of Search ........................... 370/58.1, 60, 60.1, 370/79, 82, 84, 73, 94.1, 94.2, 94.3, 480, 229, 485, 232, 486, 233, 487, 235, 395; 348/7, 12, 13, 14, 15, 16; 455/3.1, 3.2, 4.1, 4.2, 5.1, 6.1, 6.2

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,225,267 | 7/1993 | Hansen et al. . |
| 5,311,423 | 5/1994 | Clark . |
| 5,343,239 | 8/1994 | Lappington et al. . |

(List continued on next page.)

OTHER PUBLICATIONS

Adams, Michael, "Network Design and Implementation of a large–scale, ATM, Multimedia Network," *Engineer Conference Notes* from NETWORLDsm+ INTEROP® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," Timewarner Cable Full Service Network, Maitland, FL, 32751 (Dec. 144, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 195:258–266 (1995).

*Primary Examiner*—Benedict V. Safourek
*Assistant Examiner*—Ajit Patel
*Attorney, Agent, or Firm*—Holland & Hart llp

[57] ABSTRACT

A scalable communications network employing shared logical nodes and a related method are provided. The network includes one or more sources for providing program streams. The program streams may comprise a number of frequency-division multiplexed program streams generated by media servers in an interactive network. Each such source is coupled to a corresponding logical node, which receives a corresponding set of program streams. One or more subscribers are allocated to a logical node according to an expected peak subscriber usage constraint. This constraint is met by allocating subscribers to a node so that an expected maximum number of simultaneously active subscribers within the node substantially avoids exceeding the number of program streams provided by the source corresponding to the node. Each logical node includes at least one physical node. Each physical node includes at least one subscriber. The physical nodes are allocated among the logical nodes so as to satisfy the expected peak subscriber usage constraint. Further, a physical node in one logical node may be shifted to another logical node so as to continue satisfying the expected peak subscriber usage constraints of the logical nodes. A new physical node may also be added to the system and allocated to a logical node so that the peak subscriber usage constraints of the logical nodes are satisfied.

9 Claims, 4 Drawing Sheets

U.S. PATENT DOCUMENTS

| | | |
|---|---|---|
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,555,244 | 9/1996 | Gupta et al. ............................ 370/60.1 |

SCALABLE COMMUNICATIONS NETWORK EMPLOYING SHARED LOGICAL NODES

BACKGROUND

With the advent of high-speed, high-bandwidth networking (e.g. transfer rates approaching one gigabit per second), "full-service" interactive television networks deliver a broad range of digital and analog services to a large number of user/customers. Some of these services include, for example, video-on-demand, home shopping, video games, and video conferencing, as well as the usual hosts of analog television programming. These full-service networks typically include a central source location (called a "head end") that provides a stream of data and programming to subscribers. The head end itself usually comprises a bank of powerful servers connected to fast memory storage. The memory storage contains the data and applications requested by individual subscribers. As requests for data or programming are made, the head end services these requests by transporting the needed data and programming. The data and programming streams that enter into the subscriber's home are then processed by a set-top processor (also known as a set-top converter, home communications terminal (HCT) or the like).

When a subscriber requests an interactive service, a dedicated point-to-point program stream is established between the head end and the subscriber set-top. The program streams are transmitted from the head end in a time-multiplexed fashion, such as asynchronous transfer mode (ATM). These program streams are modulated onto carrier channels. Each channel in a full-service network, such as the Time Warner Full Service Network in Orlando, Fla., can carry approximately 7 to 12 program streams. Multiple modulators modulate the program streams at different carrier frequencies. The modulated signals are combined and imposed onto a laser for transmission over a fiber optic cable to a node. Each node typically serves a localized area, such as a neighborhood. At the node, the laser signal is converted back to an electrical signal for distribution over a coaxial cable to local subscriber set-tops. Each set-top "tunes" to the program stream carrying the requested service.

Interactive systems are designed to handle a predetermined peak rate. The peak rate is defined as the expected maximum percentage of subscribers requiring service at a given time. For example, out of 100 users associated with a node, experience may show that only a maximum often will be using network services requiring a point-to-point connection.

At times, peak usage by subscribers within the node may exceed the expected peak rate. In those cases, subscribers attempting to access the network will be informed that access is unavailable. If this condition occurs frequently, then the system designer would need to increase the capacity of the network so as to handle the increased peak rate. In conventional systems, this problem is anticipated by engineering the network from the first day of operation to handle a far greater peak rate than is actually expected. This design methodology is expensive and inefficient.

It is thus desired to design an interactive system that can be expanded to handle a larger capacity in a cost-effective manner.

SUMMARY OF THE INVENTION

The present invention overcomes the disadvantages of the prior art by providing a scalable communications network employing shared logical nodes, and a related method. The network includes one or more sources for providing program streams. Each source may, for example, include a modulator bank for receiving program streams from one or more media servers, and a combiner/splitter coupled to the modulator bank. Each such source is coupled to a corresponding logical node, which receives a corresponding set of program streams. According to the invention, one or more subscribers are allocated to a logical node according to an expected peak subscriber usage constraint. This constraint is met by allocating subscribers to a node so that an expected maximum number of simultaneously active subscribers within the node substantially avoids exceeding the number of program streams provided by the source corresponding to the node.

Each logical node includes at least one physical node. Each physical node includes at least one subscriber. The physical nodes are allocated among the logical nodes so as to satisfy the expected peak subscriber usage constraint. Further, a physical node in one logical node may be shifted to another logical node so as to continue satisfying the expected peak subscriber usage constraints of the logical nodes. A new physical node may also be added to the system and allocated to a logical node so that the peak subscriber usage constraints of the logical nodes are satisfied.

BRIEF DESCRIPTION OF THE DRAWINGS

The drawings set forth exemplary embodiments of the invention as follows.

DETAILED DESCRIPTION OF THE INVENTION

The present invention provides a scalable communications network employing shared logical nodes, and a related method. In the following description, numerous details are set forth for purposes of explanation. However, one of ordinary skill in the art will realize that the invention may be practiced without the use of these specific details. In other instances, well-known structures, process steps and the like are omitted in order not to obscure the description of the invention with unnecessary detail.

Figure 1:
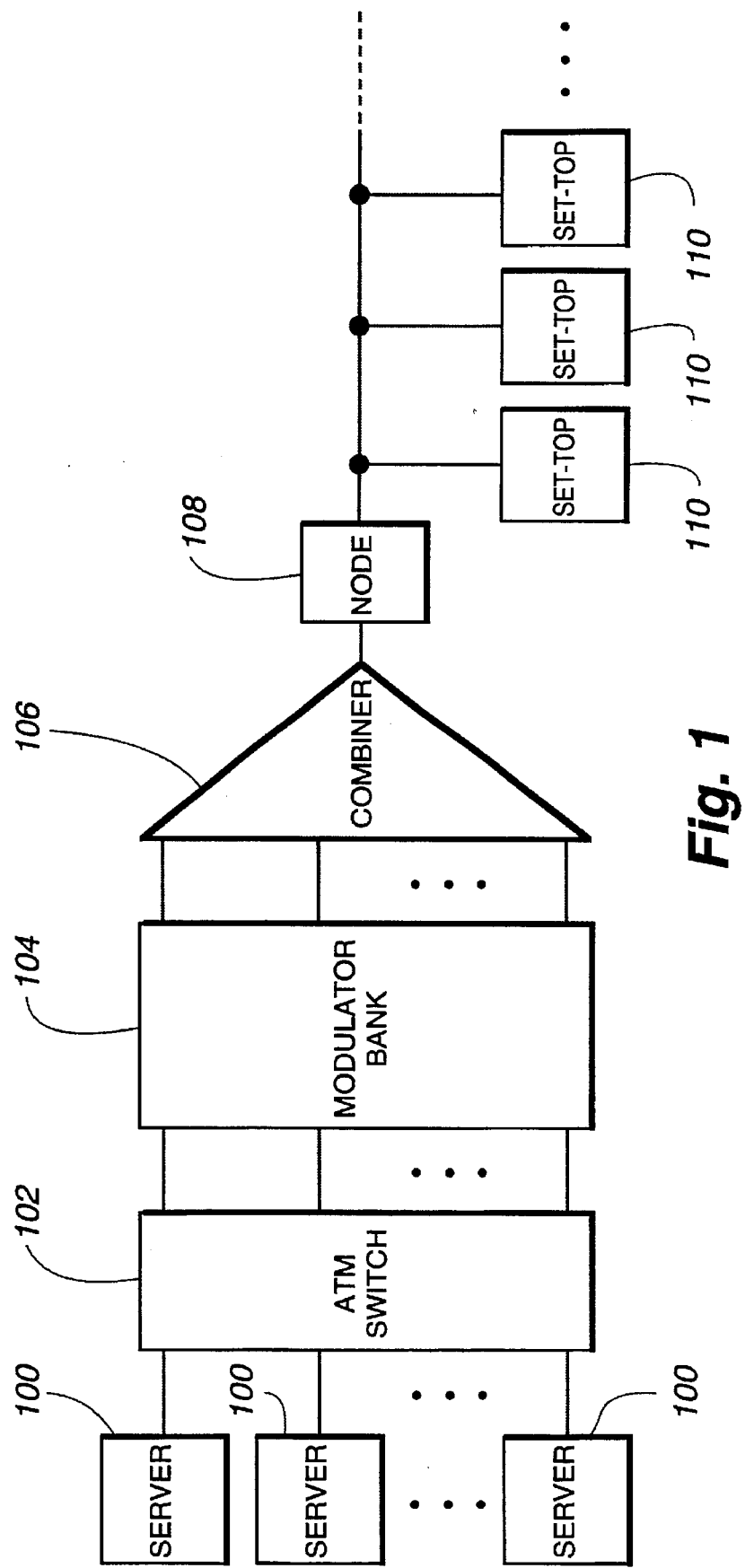
FIG. 1 illustrates a portion of an interactive communication system which may incorporate the invention.

FIG. 1 presents the relevant portion of an interactive communication system which may incorporate the invention. The illustrated section is used for transmitting signals in the forward or downstream direction from the media servers to the set-tops. Those skilled in the art will recognize that such an interactive system also includes components (not shown) for transmitting signals in the reverse or upstream direction from the set-tops to the servers. One such interactive network is the Time Warner Full Service Network operating in Orlando, Fla. Another such network is described in U.S. Pat. No. 5,442,700, issued to Snell, et al. on Aug. 15, 1995, which is incorporated by reference herein.

The system includes a number of media servers 100 coupled to a switch 102, such as an ATM switch, a number of modulators 104, each feeding a non-overlapping frequency channel into a combining network 106, and a node 108 serving a neighborhood of subscriber set-tops 110. Each set-top 110 controls the operation of a corresponding television (not shown). In addition, each set-top 110 establishes a communications link between the television viewer and a server 100, presents selectable programming options provided by the servers 100 to the viewer, and relays program selections and commands from the viewer to the servers 100.

In operation, a set-top 110 transmits a request to the media servers 100 for programming or an application. In response, the appropriate media server 100 sends the programming or application downstream to the requesting set-top 110. In one embodiment, information is sent in the form of ATM packets through an ATM switch 102 to the set-top 110. Consequently, a point-to-point communications link is established between a media server 100 and a set-top 110. Information transmitted over this dedicated link will be referred to as a program stream.

Figure 2:
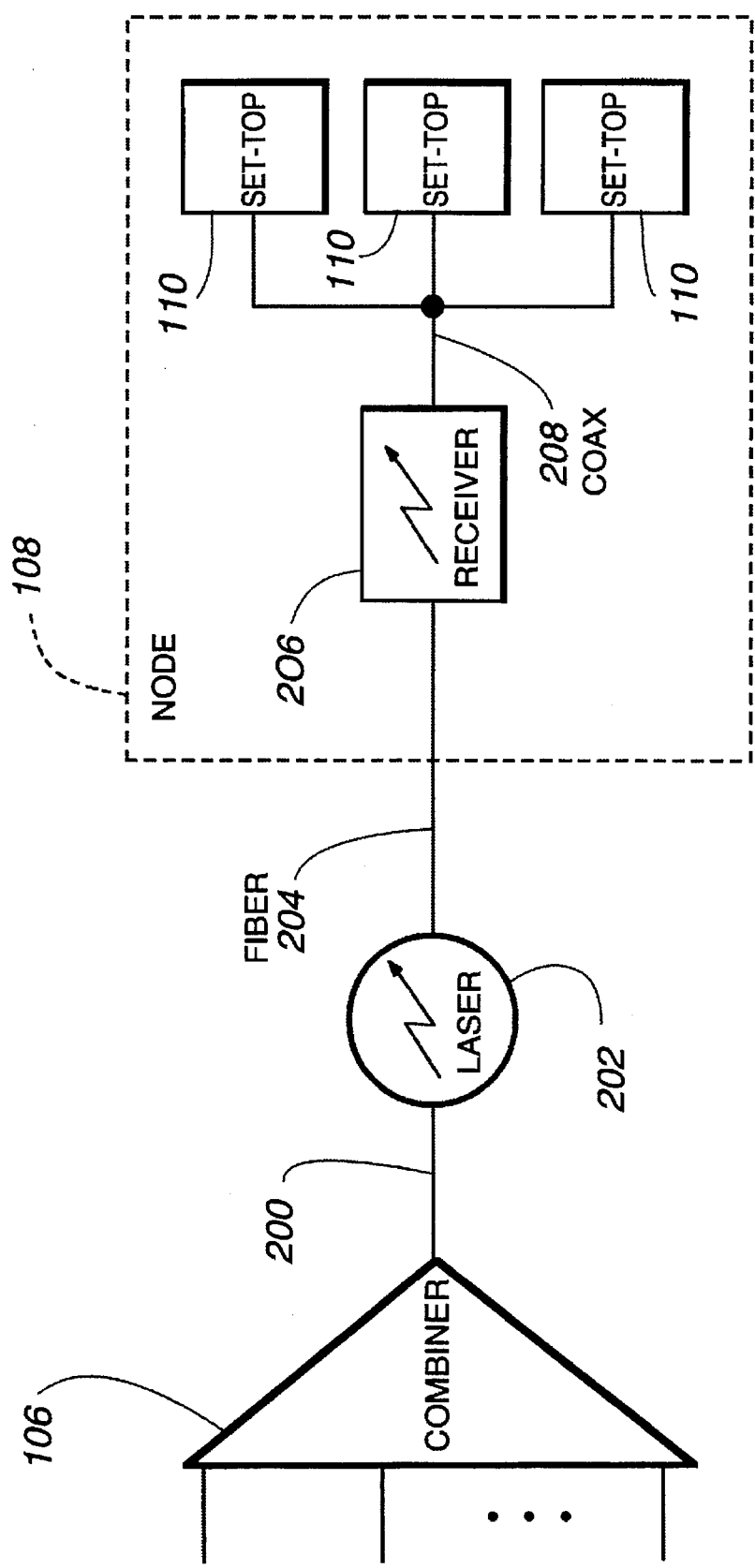
FIG. 2 illustrates one embodiment of the connection between the combiner and the node of FIG. 1.

The node 108 shown in FIG. 1 serves a neighborhood of subscriber set-tops 110. FIG. 2 illustrates one embodiment of the connection between the combiner 106 and the node 108 of FIG. 1. The set of channels 200 from the combiner 106 is used to modulate a laser 202, which transmits the modulated signal over a fiber optic link 204 to a laser receiver 206 associated with the node 108. The laser receiver 206 converts the light signal back into an electrical signal for transmission over a coaxial cable 208 to the set-top 110 within the node 108.

Figure 3:
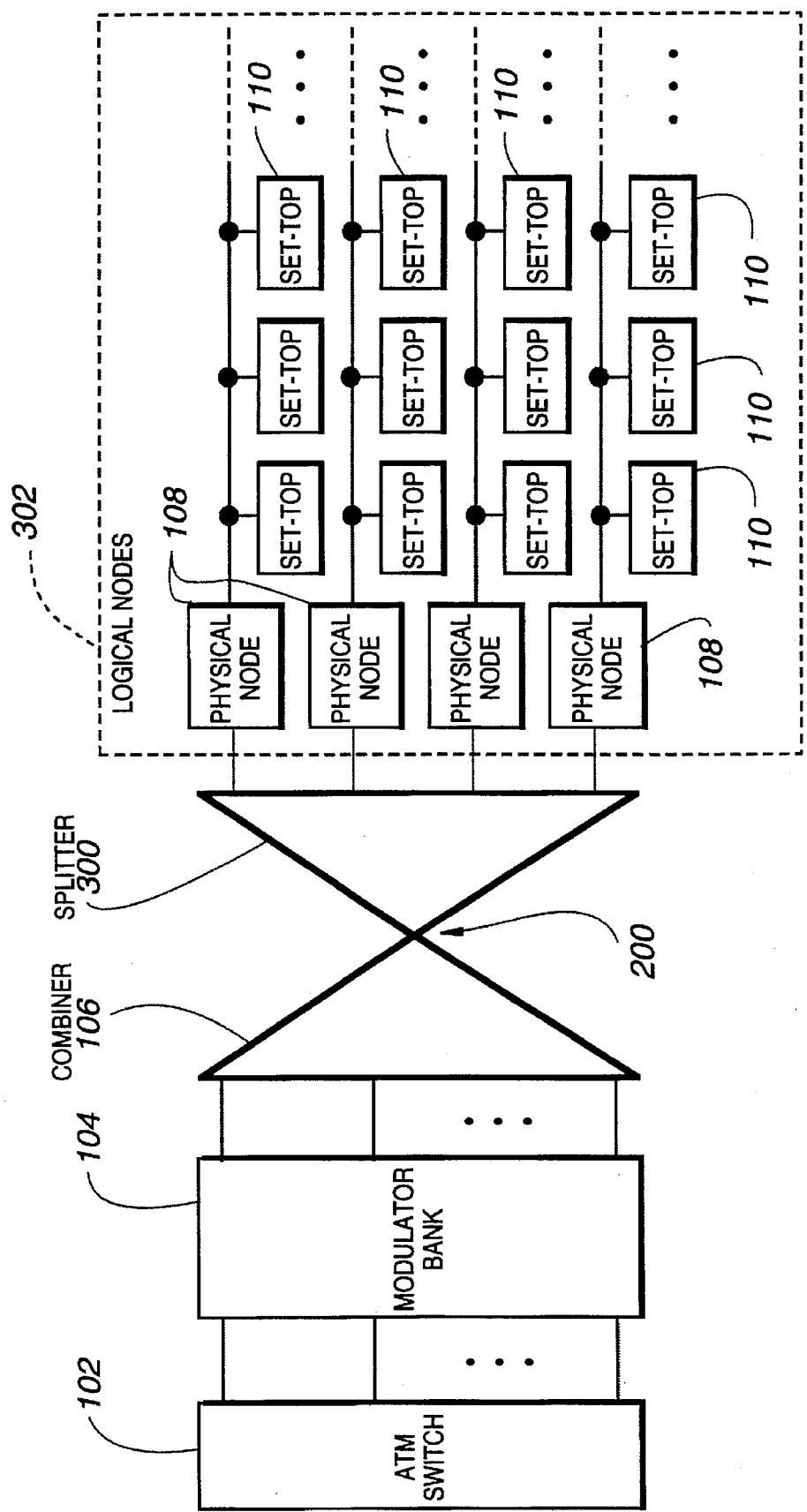
FIG. 3 illustrates an example of a network of the present invention in which a channel set from a modulator bank is distributed to four physical nodes in a logical node.

The laser light signal may be optically split to serve more than one node. Alternatively, the combiner signal feeding the laser may be split electrically to provide the set of channels to multiple lasers, each laser receiving one set. These concepts are embodied generically in the network of the present invention shown FIG. 3. As is well known in the art, the output of the combiner 106 may be fed into an optical or electrical splitter 300 depending upon which implementation is selected. In this manner, the same set of channels 200 from the bank of modulators 104 is transmitted to multiple nodes 108, each of which may serve a different neighborhood.

According to the prior art, an interactive network is engineered to handle a predetermined maximum peak usage rate. For example, the Time Warner Full Service Network was designed to accommodate a high peak usage rate of 25%. All resources within the system were allocated and designed to meet this specification. Even though this peak rate is unlikely to be met, it was selected to account for the possibility that the percentage of simultaneously active subscribers may grow in the future as the public demands more network services more frequently. One problem with this design methodology is the high up-front costs of implementing a network to handle an unnecessary large capacity from the first day of operation. It is unlikely that early revenues from subscribers will justify the associated costs.

Experience with the Time Warner Full Service Network has demonstrated that the peak usage rate is actually on the order of one to two percent of subscribers within a neighborhood, confirming the economic inefficiency of designing to a 25% peak rate. Unlike the prior art, the network of the present invention takes into the account expected actual peak usage and allows for scaling of the network in response to subsequent changes in peak usage. Referring back to FIG. 3, the figure illustrates an example of a network in which the channel set 200 from the modulator bank 104 is distributed to four physical nodes 108. Here, a physical node 108 refers to a laser receiver 206 and the set-tops 110 served by the laser receiver 206. The signals fed to the physical nodes 108 may be optically split, as well as split at the electrical input to the lasers. Typically, a physical node 108 serves a particular neighborhood, and thus is also known as a neighborhood node.

According to the present invention, the physical nodes 108 are aggregated into one or more logical nodes 302 to utilize the channel capacity of the modulators 104 most efficiently by taking into account the expected peak subscriber usage of the physical nodes 108. For example, assume that the modulator bank 104 includes ten modulators, each capable of carrying ten program streams. The combiner 106 combines these modulated signals into one ten-channel frequency-division multiplexed output. The splitter 300 distributes this channel set 200 to each physical node 108 within the logical node 302.

According to this example, the modulator bank 104 has a channel capacity of 100 dedicated point-to-point program streams. According to the present invention, physical nodes 108 are aggregated into a logical node 302 so that ideally the expected peak subscriber usage is matched to the modulator capacity, or at least selected so that actual subscriber usage is unlikely to exceed modulator capacity. Here, expected peak subscriber usage refers to the expected maximum number of simultaneously active subscribers within a logical node. An active subscriber refers to a subscriber requiring access to a dedicated program stream. Of course, peak subscriber usage is related to the peak rate ((expected maximum number of simultaneously active subscribers within a physical node)/(total number of subscribers within the physical node)). Peak subscriber usage rate may be defined as peak subscriber usage/modulator capacity. In this example, assume that four physical nodes 108 having a cumulative expected peak subscriber usage of 80 subscribers are aggregated into one logical node 302 to access the 100 program streams of the modulator bank 104. The system is thus designed for an expected 80% peak subscriber usage rate, allowing a 20% safety margin for situations in which actual subscriber usage may exceed the expected number. The safety number in this example is arbitrary and may be set to other values depending upon the expected deviation from the expected subscriber usage number.

Aggregating physical nodes in this manner permits efficient allocation of network resources. For example, if only one physical node having an expected peak subscriber usage of five subscribers were serviced by the modulator bank, then the hardware overhead (the modulator bank, etc.) for the associated neighborhood would be unacceptably high. However, by aggregating that low-usage node with other nodes, subscriber usage by the resulting logical node is far more economically efficient.

Still referring to the example, the peak rates of the physical nodes within the logical node may begin to rise such that the subscriber usage rate of the logical node consistently exceeds 80 or even 100%. The present invention solves this problem by scaling up the network to make more program streams available to the physical nodes.

Figure 4:
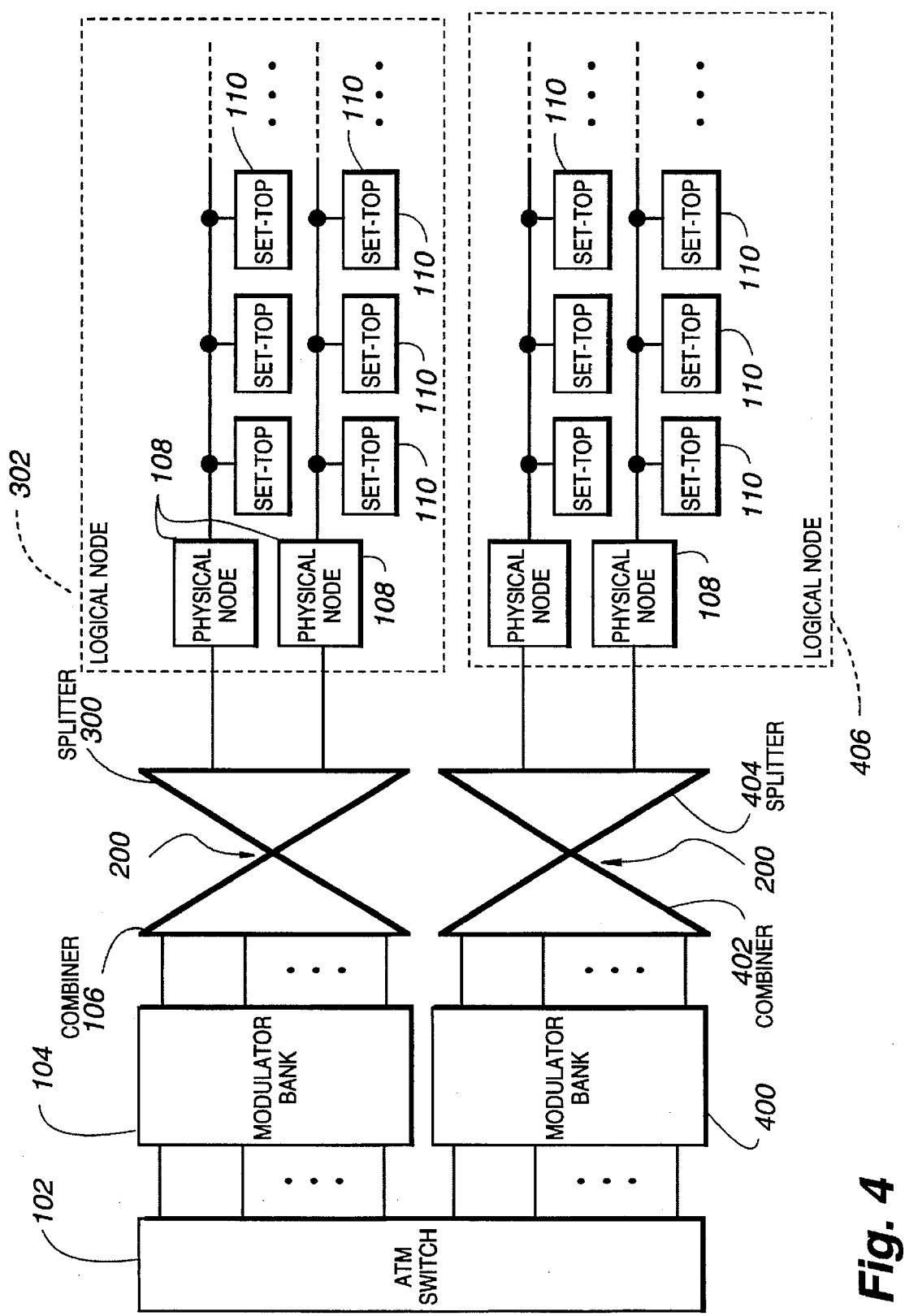
FIG. 4 illustrates an embodiment of the present invention including two logical nodes.

The bottleneck in making program streams available to the physical nodes 108 occurs at the modulator bank 104. The media servers 100 and ATM switch 102 typically have the capacity to handle far more program streams than one typical bank of modulators 104. Accordingly, as shown in FIG. 4, the network may be scaled up to take advantage of this extra capacity by adding another bank of modulators 400, another combine 402/splitter 404, and an associated logical node 406. These modulators 400 may modulate the program streams onto the same set of carders as the pre-existing modulator bank 104. Alternatively, the added modulator bank 400 may modulate the program streams onto different carriers. In either case, the added modulator bank 400 provides a new set of dedicated communications links between the media servers 100 and the subscribers 110 in the newly created logical node 406. The system designer would reallocate one or more physical nodes 108 from the existing logical node 302 to the new logical node 406 so that the expected subscriber usage of each logical node roughly matches the channel capacity of the associated modulator bank (taking into account the safety margin) as the subscriber usage for the logical node changes over time. Further, as new neighborhoods are added to the network, the new physical nodes can be allocated among preexisting logical nodes or incorporated into a new logical node.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A scalable communication system comprising:

at least one source for providing a plurality of program streams;

at least one logical node, each logical node coupled to a corresponding source for receiving a corresponding set of program streams, wherein subscribers are allocated to the at least one logical node according to an expected peak subscriber usage constraint;

each logical node including at least one physical node, each physical node including at least one subscriber, wherein the at least one physical node is allocated among the logical nodes so as to satisfy the expected peak subscriber usage constraint;

the at least one source comprising a first source and a second source respectively corresponding to a first logical node and a second logical node, wherein at least one physical node in the first logical node is shiftable to the second logical node so as to satisfy the expected peak subscriber usage constraint.

2. The system of claim 1, wherein subscribers are allocated to the at least one logical node so that an expected maximum number of simultaneously active subscribers within the at least one logical node is unlikely to exceed the number of program streams provided by the source corresponding to the at least one logical node.

3. The system of claim 1, wherein a physical node may be added to the system and allocated to a logical node so as to satisfy the peak subscriber usage constraint.

4. A method for scaling a communications network having at least a first and a second source for providing a plurality of program streams, the method comprising the steps of:

aggregating at least one physical node each to a first and second logical node to form a first logical node and a second logical node, wherein each physical node comprises at least one subscriber, and the at least one physical node is allocated to each of the first logical node and the second logical node so as to satisfy an expected peak subscriber usage constraint;

coupling the first logical node and the second logical node to the first and second source respectively to receive a corresponding set of program streams; and shifting at least one physical node from the first logical node to the second logical node so as to satisfy a new peak subscriber usage constraint.

5. The method of claim 4, wherein the aggregating step comprises the step of allocating subscribers to each of the first logical node and the second logical node so that an expected maximum number of simultaneously active subscribers within each of the first logical node and the second logical node is unlikely to exceed the number of program streams provided by the first source and the second source corresponding respectively to the first logical node and the second logical node.

6. The method of claim 4 further comprising the steps of:

adding a new physical node to the communications network; and allocating the new physical node to one of the first logical node and the second logical node so as to satisfy the new peak subscriber usage constraint.

7. A scalable communications system comprising:

at least one modulator bank for providing a corresponding set of program streams, the at least one modulator bank including at least one modulator;

at least one combiner/splitter, coupled to a corresponding modulator bank, for providing duplicate corresponding sets of program streams; and at least one logical node, each logical node coupled to a corresponding combiner/splitter, each logical node including at least one physical node, each physical node for receiving one of the duplicate corresponding sets of program streams, the physical node including at least one subscriber, wherein the at least one physical node is allocated to the at least one logical node according to an expected peak subscriber usage constraint and wherein the at least one physical node in the corresponding at least one logical node is shiftable to another logical node so as to satisfy a new expected peak subscriber usage constraint.

8. The system of claim 7, wherein the at least one physical node is allocated to the at least one logical node so that an expected maximum number of simultaneously active subscribers within the at least one logical node is unlikely to exceed the number of program streams in the corresponding set of program streams.

9. The system of claim 7, wherein a physical node may be added to the system and allocated to a logical node so as to satisfy the new expected subscriber usage constraint.

* * * * *